United States Patent [19]

Culbertson

[11] Patent Number: 4,642,263
[45] Date of Patent: Feb. 10, 1987

[54] ANTISTAT COATED FILMS

[75] Inventor: Edwin C. Culbertson, Greer, S.C.

[73] Assignee: American Hoechst Corporation, Somerville, N.J.

[21] Appl. No.: 683,435

[22] Filed: Dec. 18, 1984

[51] Int. Cl.$^4$ ............ B32B 27/08; B32B 27/36
[52] U.S. Cl. .................. 428/336; 428/341;
428/412; 428/474.4; 428/480; 428/515;
428/518; 428/523
[58] Field of Search .......... 524/331; 428/480, 523,
428/341, 340, 334–336, 474.4, 515, 523, 518,
412; 430/535; 252/8.8

[56] References Cited

U.S. PATENT DOCUMENTS

| | | | |
|---|---|---|---|
| 2,698,240 | 12/1954 | Alles et al. | 430/535 |
| 3,954,633 | 5/1976 | Dollinger et al. | 252/8.8 |
| 4,104,443 | 8/1978 | Latta et al. | 428/480 X |
| 4,204,018 | 5/1980 | Bernstein et al. | 428/480 X |
| 4,214,035 | 7/1980 | Heberger | 428/340 |
| 4,215,035 | 7/1980 | Memering et al. | 524/331 |
| 4,302,505 | 11/1981 | Heberger | 428/341 |
| 4,302,506 | 11/1981 | Heberger | 428/341 |

FOREIGN PATENT DOCUMENTS

| | | | |
|---|---|---|---|
| 1079402 | 8/1967 | United Kingdom | 428/523 |
| 1268780 | 3/1972 | United Kingdom | 428/323 |
| 1411564 | 4/1972 | United Kingdom | 428/480 |
| 1353076 | 5/1974 | United Kingdom | 428/336 |
| 1558064 | 2/1976 | United Kingdom | 428/523 |

Primary Examiner—Thomas J. Herbert
Attorney, Agent, or Firm—James C. Lydon; Michael J. Tully

[57] ABSTRACT

Plastic films having improved antistatic properties are disclosed having a continuous coating on at least one surface of the film based on a composition comprising a mixture of:
(a) a polymeric binder, and
(b) a quarternary ammonium salt having the formula:

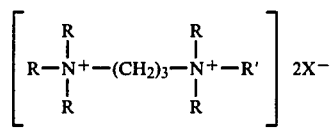

wherein:
R is a lower alkyl group having 1 to 3 carbon atoms;
R' is an alkyl or alkenyl radical having from about 8 to 20 carbon atoms; and
X$^-$ is an anion.

The antistat coating composition may be applied to the film material at any suitable stage during manufacture, i.e., after extrusion of the sheet material or before, during or after orienting the sheet. The resultant film is found to possess markedly enhanced antistat properties, good clarity, good slip properties, reclaimability and adhesive properties at higher binder levels rendering it suitable for the application of other coatings.

17 Claims, No Drawings

4,642,263

ANTISTAT COATED FILMS

BACKGROUND OF THE INVENTION

This invention is directed to an improved plastic film having excellent antistatic properties and to a method for producing such film. More specifically, the invention concerns improved biaxially oriented polyester films having improved antistatic properties coupled with altered surface properties which render the film printable or coatable with additional coatings such as photosensitive compositions.

The growth of the packaging, reprographic, microfilm and magnetic tape markets has significantly increased the utilization of plastic film materials in these fields, particularly biaxially oriented plastic film made from polyethylene, polypropylene, nylon, polyester, polystyrene and polycarbonate. One of the problems associated with the use of such film is the tendency of these materials to accumulate an electrostatic charge on the surface as the result of handling or processing of the film, particularly at low relative humidity. This electrostatic charge attracts not only dust and other contaminants, but additionally attracts other film. For instance, in the case of polyester film supports, electrostatic charges may interfere with the collating, sorting and developing of microfiche cards or transparent supports and cause these materials to stick together.

To overcome this serious problem, antistatic films have been developed. Antistatic films are usually formed by the application of an antistatic coating onto the surface of the film. Many of these coatings have successfully reduced the electrostatic properties of the film to satisfactorily low levels. However, many of these coatings can cause blocking. That is, the film coated with an antistatic layer has a coefficient of friction high enough so that one layer of the film does not slip over another or over rollers and other equipment over which the film moves during operation.

Another problem arising from the coating of an antistatic layer onto a surface of a film is the decreased clarity resulting therefrom. This property, usually reported as haze, is very important in microfilm applications. Microfilm must be readable. Light is projected through the film so that the viewer may read the information printed on the film. Poor clarity results in fuzziness and difficulty in reading because of loss of light intensity.

Yet a third problem associated with the application of an antistat coating is its ability to remain adhered to the surface of the film, particularly where the film is later treated with printing or coating compositions.

Also important to the film manufacturer is the reclaimability of scrap film produced during the film making process. Any coating applied during manufacture will be present on the scrap film as an impurity. This impurity can give rise to a discoloration as a consequence of film reprocessing because of high temperature conditions encountered in the film making process.

Various antistat coatings are disclosed in the prior art. For example, U.S. Pat. No. 4,214,035 teaches the application to polyester film of an antistat coating based on a mixture of stearamidopropyldimethyl-beta-hydroxyethylammonium nitrate and a crosslinkable acrylic terpolymer binder, present in an approximately three to one ratio respectively. Although this antistat coating improves the antistat properties of the film, the relatively high level of antistat compound to binder renders the coating relatively more expensive. Also, reclaim from such film does exhibit discoloration when reprocessed into new film which is undesirable, particularly where the film is to be used for reprographic applications. Finally, the antistat surface of such film is not readily susceptible to the application of additional coatings, particularly in reprographic applications.

British Pat. No. 1,558,064 discloses the use of certain quarternary ammonium salts as an antistat coating for polyolefin film such as polypropylene. These salts have the formula:

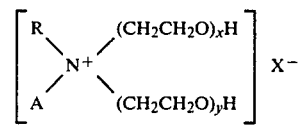

wherein A is lower alkyl, R is an aliphatic radical having 1 to 22 carbons, x and y are integers having the sum of 2 to 5, and $X^-$ is an anion. The utilization of this material as disclosed in the patent, aside from its effectiveness as an antistat, does not resolve the problem of the lack of adhesion of additional coatings over the antistat coating.

Accordingly, it is an object of this invention to provide plastic film material having improved antistatic properties as well as good blocking properties and low haze.

Another object is to provide a method for improving the antistatic properties of biaxially oriented polyester film for use in the graphic arts field.

Still another object is to provide an antistat coating on at least one surface of biaxially oriented polyethylene terephthalate film which coating also provides a suitable base coat or primer coat for the application of additional coatings.

Yet another object is to provide a biaxially oriented plastic film material having enhanced antistatic properties and which can be successfully reclaimed in the plant by the film manufacturer.

SUMMARY OF THE INVENTION

These and other objects of the invention may be achieved by the application of a continuous coating on at least one surface of a plastic film material, said coating based on a composition comprising a mixture of:

(a) a polymeric binder, and
(b) a quarternary ammonium salt having the formula:

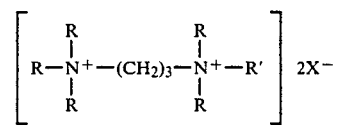

wherein:
R is a lower alkyl group having 1 to 3 carbon atoms;
R' is an alkyl or alkenyl radical having from about 8 to 20 carbon atoms; and
$X^-$ is an anion.

The quarternary ammonium salt (QAS) compound and polymeric binder may be present within a respective ratio of about 10 to 80% by weight QAS per corresponding about 90 to 20% by weight of polymeric binder on a dry weight basis, with the preferred level of QAS being from about 25 to 75% by weight.

The antistat coating composition may be applied to the film material at any suitable stage during manufacture, i.e., after extrusion of the sheet material or before, during or after orienting the sheet. The resultant film is found to possess markedly enhanced antistat properties, good clarity, good slip properties, reclaimability and adhesive properties at higher binder levels rendering it suitable for the application of other coatings.

DETAILED DESCRIPTION OF THE INVENTION

Film bases to which the present invention applies include polyester, polyolefins such as polyethylene or polypropylene, nylon (polyamide), polystyrene and polycarbonate. The invention is particularly applicable to film based on crystallizable polyesters such as resulting from the polycondensation of a glycol such as ethylene glycol or butane diol and mixtures thereof with terephthalic acid or mixtures of terephthalic acid and other dicarboxylic acids such as isophthalic acid, diphenic acid and sebacic acid, or their polyester forming equivalents, which polyesters are made by methods well known in the art. The preferred film base is polyethylene terephthalate and the invention will be illustrated using this film.

The film may be produced by techniques also well known in the art using well known apparatus. For example, polyester is melted and extruded as an amorphous sheet onto a polished revolving casting drum to form a cast sheet of the polymer. Thereafter, the sheet is axially stretched in one direction, either in the direction of extrusion (longitudinal), or perpendicular to the direction of extrusion (transverse) in the case of monoaxially oriented film, and in two directions in the case of biaxially oriented film, that is, the film is stretched in both the longitudinal and transverse directions. The first stretching step of the cast sheet may be in either of these two orthogonal directions. The amount of stretching, to impart strength and toughness to the film, can range from about 3.0 to about 5.0 times the original cast sheet dimension in one or both directions. Preferably, the amount of stretching is in the range of between about 3.2 and 4.2 times the original dimension. The stretching operations are carried out at temperatures in the range of from about the second order transition temperature to below the temperature at which the polymer softens and melts.

Where necessary, the film is heat treated, after stretching, for a period of time necessary to crystallize the polyester film. Crystallization imparts stability and good tensile properties to the film. When polyethylene terephthalate is heat treated, it is subjected to a temperature in the range of between about 190° C. and 240° C. and, more preferably, in the range of from about 215° C. and 235° C.

The antistat coating composition of this invention in the form of an aqueous dispersion is preferably applied in-line at one of two stages during the film manufacture: the pre-draw stage at the point between the casting of the amorphous sheet and the first stretch by the method disclosed, for example, in British Pat. No. 1,411,564 or the inter-draw stage subsequent to the uniaxial drawing but prior to biaxial drawing by the method disclosed, for example, in U.S. Pat. No. 4,214,035. Normally, the heat applied to the film during the stretching or final conditioning stages is sufficient to evaporate off the water and other volatiles and dry the coating. In some applications, the coating may also be applied to finished film. This technique of application is less preferred because the adhesion of the coating to the film is not as good as can be achieved by in-line application.

In one preferred embodiment, the coating is applied after the film is uniaxially stretched, that is, after the film is stretched in one direction, but before the film is stretched in the orthogonal direction. In another preferred embodiment, the polyester film is first stretched in the longitudinal direction prior to coating. In this preferred embodiment, after longitudinal stretching, the film is coated by any of the well known techniques employed in the art. For example, coating may be effected by roller coating, spray coating, slot coating or immersion coating. In a preferred embodiment, the polyester film is coated by means of gravure roller coating. Also, the uniaxially drawn film is preferably subjected to a corona discharge by a corona discharge apparatus prior to coating as is known in the art. The discharge treatment decreases the hydrophobic character of the polyester film surface which permits the water based coating to more easily wet the surface and thus improve the adhesion of the coating to the surface.

As indicated above under the Summary of the Invention, the antistat composition comprises a mixture of a quarternary ammonium salt compound having the recited formula and a polymeric binder. In the preferred embodiment, the R substituent may be the same or different throughout and is preferably methyl or ethyl; $R^1$ is a $C_{14}$ to $C_{18}$ residium of saturated acids, monoethenoid acids, and diethenoid acids such as tallow, and X is chloride, lower alkylsulfate or tosylate. The most preferred quarternary ammonium salt is N, N, N, $N^1$, $N^1$-pentamethyl-$N^1$-tallow trimethylenediammonium-bis (methyl sulfate) having the formula:

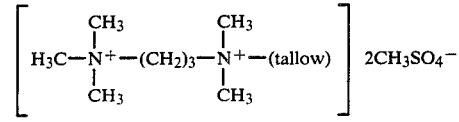

These compounds and their method of preparation are disclosed in U.S. Pat. No. 3,954,633, incorporated herein by reference. This patent also discloses that the compounds are useful as lubricants and antistatic agents to assist in the processing of natural and synthetic fibers.

Suitable polymeric binders which may be used include acrylic or methacrylic polymers such as polymethylmethacrylate, copolymers of methyl methacrylate with acrylates such as ethyl acrylate or butyl acrylate, and terpolymers of methyl methacrylate, ethylacrylate and either acrylamide or methacrylamide, or either N-methylolacrylamide or N-methylolmethacrylamide. In many cases it is desirable that the polymeric binder be crosslinkable. This may be accomplished by employing up to about 10 mole percent of a "self crosslinking" functional comonomer into the binder, such as N-methylolacrylamide, or by incorporating a suitable amount of cross linking agent such as melamine formaldehyde or urea formaldehyde condensate capable of reacting with a functional group present in the polymer chain, such as amido, carboxyl, epoxy, or hydroxy groups. Other suitable binders include vinyl acetate polymers such as polyvinylacetate and copolymers based on vinylacetate, copolymers containing polymerized vinylidene chloride, i.e., copolymers of vinylidene chloride, acrylic ester and itaconic acid as disclosed in U.S. Pat. No. 2,698,240; and vinylaromatic polymers such as polystyrene and copolymers containing polymerized styrene. Crosslinkable versions of these materials may also be employed. The preferred binders for the purposes of this invention are the crosslinkable acrylics, most preferably acrylic terpolymers based on about 39 to 70 mole percent methyl methacrylate, about 60 to 29 mole percent ethylacrylate, and from about 1 to 10 mole percent of acrylamide, methacrylamide, or N-methylolacrylamide. The acrylics offer the best balance of antistat properties as well as good clarity, blocking resistance, and reclaimability.

The antistat coating may contain from about 15 to 75% by weight of the quarternary ammonium salt (QAS) compound and correspondingly about 85 to 25% by weight of polymer binder on a dry weight basis. This roughly corresponds to a respective range of 3 to 1 part QAS compound per 1 to 5 parts polymer binder. It has been unexpectedly found that with the acrylic binders, a respective ratio of as little as 1 part of the QAS compound per 3.75 parts binder imparts antistat properties to polyester film comparable to the properties imparted by the antistat nitrates of U.S. Pat. No. 4,214,035 employed at a respective 3 part nitrate per 1 part binder ratio. Use of higher ratios of the QAS compound, e.g., from about 1 to 1 up to about 3 to 1 imparts even better properties. Preferred ratio of (QAS) compound to binder is about 25% to 75% by weight (QAS) compound and about 75% to 25% by weight binder.

The antistat coating of the present invention may be applied to the base film as an aqueous dispersion and at a solids concentration within the range of about 0.5 to 15%, preferably about 1 to 8%. The preferred solids level is such as to yield a final dry coating thickness within the range of about $10^{-7}$ to $10^{-5}$ inch, which translates into a solids level on a weight basis of from $0.00305 g/m^2$ to $0.305 g/m^2$. The preferred thickness range of the dried coating is from about $1.0 \times 10^{-7}$ to $3.0 \times 10^6$ inch.

The antistat coating may be applied to one or both sides of the film, or it may be applied to one side and a different coating such as a thermosetting acrylic or methacrylic coating applied to the opposite side, such as taught in U.S. Pat. No. 4,214,035. Other additives known in the art may also be present in the coating formulation such as wetting agents, surfactants, pH regulating agents, anti-oxidants, dyes, pigments, slip agents such as colloidal silica, and the like. Additives or polymeric binders which lead to ion exchange type reactions with the quarternary ammonium compound are to be avoided.

The antistat coatings of this invention exhibit excellent heat stability. For example, scrap coated polyester film made during production can be mixed with fresh polyester, remelted and refed to the film-forming extruder to produce oriented film. Such film produced containing up to about 50% by weight of coated scrap reclaim (containing a heat stable binder such as an acrylic) exhibits good quality, color and appearance with minimal degradation of properties due to the presence of the coating impurity. Thus the coated film of this invention can offer distinct commercial advantage to the film manufacturer over many other antistat films, such as films disclosed in U.S. Pat. No. 4,214,035, which tend to degrade and discolor to a greater degree when reclaimed as set forth above.

The ability to employ higher levels of binder with respect to the amount of QAS in the coating composition and still maintain good antistat properties renders film coated with the antistat composition amenable to the application of additional coatings. For example, polyester films coated with the antistat composition of this invention which contain, as a binder, a crosslinkable acrylic polymer present at a level of at least about 50% by weight, preferably at least 65% by weight, has excellent utility as a film base for the production of photosensitive reprographic films. Such films are prepared by forming an additional coating on the surface of the antistat coating present on the surface of the polyester film, which additional coating comprises a photosensitive composition containing an organic solvent solution of a resinous binder containing or impregnated with a light sensitive diazonium compound, and drying said coating. Resinous binders suitable for this purpose include cellulose acetate butyrate, cellulose acetate, cellulose acetate propionate as well as vinyl polymers such as polyvinyl acetate. Suitable solvents include acetone, methyl ethyl ketone, methyl isobutyl ketone, ethylene glycol monomethyl ether and mixtures thereof. These reprographic coatings and their method of application and use are well known in the art as used with other base films.

Similarly such antistat coated film forms an excellent substrate for the application of matte coatings which render the film suitable for use as a drawing or drafting material. These matte coatings may be based on organic solvent composition comprising a resinous binder and a finely divided particulate material which serves as a "toothing agent". The resinous binder may include the resinous materials referred to above as well as acrylic or methacrylic resins. The organic solvents may also include those listed above. Particulate materials include finely divided (less than 10 micron particle size) clays or silica. Other ingredients such as thickeners or dispersing agents may also be present in such matte formulations.

Yet another application of the antistat coated film of this invention is as a packaging or label material. The coated films demonstrate improved adhesion to printing inks when compared with uncoated film.

The following examples are illustrative of the invention.

EXAMPLE 1

An aqueous dispersion of the antistat coating composition was prepared by forming an intimate mixture of a water dispersion of N, N, N, $N^1$, $N^1$-pentamethyl-$N^1$-tallow trimethylenediammonium-bis (methyl sulfate) and a polymeric latex based on a crosslinkable terpolymer of methyl methacrylate, ethyl acrylate and methacrylamide, also containing a sufficient amount of a melamine/formaldehyde condensate to crosslink the polymer upon the application of heat. The components were mixed to yield a ratio of quarternary ammonium salt compound to polymer of about 1.3 to 1 on a dry weight basis. The dispersion was diluted with water to a 4% by weight solids level.

The above dispersion was applied to one side of polyester film as follows:

Virgin polyethylene terephthalate polymer was melted and extruded through a slot die onto a casting drum maintained at a temperature of about 20° C. The melt froze to form a cast sheet, and was then longitudinally stretched at a draw ratio of about 3.6:1 while maintaining a temperature of about 80° C.

The longitudinally drawn film was corona treated by a corona discharge apparatus and thereinafter coated with the latex described above by gravure coating.

The corona treated, longitudinally drawn, coated film was dried at a temperature of about 100° C. Thereafter, the film was stretched in the transverse direction at a draw ratio of 3.6:1 to produce a biaxially drawn film. The biaxially drawn film was heat set at a temperature of 230° C. These heat treatments resulted in the crosslinking of the primer coating. The dry weight of the coating was about 0.035 g/m² with a coating thickness of about $1 \times 10^{-6}$ inch and a base film thickness of about 3 mils.

The film prepared in Example 1 was evaluated for surface resistivity at 50% RH using a Keithley Instruments electrometer (Model 610B). Resistivity may also be measured in accordance with ASTM Test D257-66. A control sample of uncoated 3 mil biaxially oriented polyethylene terephthalate film was also evaluated. The resistivity of the film of Example 1 was $2 \times 10^9$ ohms; the resistivity of the control was greater than $10^{16}$ ohms.

Surface resistivity of less than $10^{10}$ represents a film having excellent antistatic properties, whereas a resistivity in excess of $10^{13}$ ohms is considered generally unacceptable. Preferable resistivities achieved according to this invention are not greater than about $10^{11}$ ohms.

EXAMPLES 2-28

Twenty three coated films were prepared as in Example 1 except the respective solids levels of each component of the coating were adjusted to give varying ratios of the quarternary ammonium salt compound (designated as Q in Table 1) to acrylic polymer (designated as A in Table 1) within the respective range of from about 1.3:1 to about 1:3.75. The solids level of the coating mixture was also adjusted to give different coating thicknesses.

In Examples 25–28, stearamidopropyldimethyl-beta-hydroxyethyl-ammonium nitrate (designated as N in Table 1) was substituted for the quarternary ammonium compound of Example 1 at a respective 3:1 dry weight ratio.

As can be seen from a review of the data in the Table, the antistat coating of the present invention imparts excellent antistat properties to the polyester film, with the degree of enhancement varying as a function of coating thickness and ratio of components in the coating. Examples 25–28 illustrate that very high levels of the tested prior art antistat and high coating thicknesses are required to give results comparable to those films made in accordance with this invention.

TABLE

| EXAMPLE | FORMULATION | COATING THICKNESS (MICRO INCH) | SURFACE RESISTIVITY (OHMS AT 50% RH) | % REPROGRAPHIC ADHESION |
| --- | --- | --- | --- | --- |
| 2 | Q + A (1.3:1) | 0.41 | $3.3 \times 10^{11}$ | 10 |
| 3 | " | 0.54 | $1.6 \times 10^{10}$ | — |
| 4 | " | 0.71 | $5.0 \times 10^{9}$ | — |
| 5 | " | 0.61 | $2.4 \times 10^{9}$ | — |
| 6 | " | 0.66 | $1.8 \times 10^{9}$ | 25 |
| 7 | " | 0.96 | $1.9 \times 10^{9}$ | — |
| 8 | " | 1.10 | $9.5 \times 10^{8}$ | 25 |
| 9 | Q + A (1:1.5) | 0.99 | $3.2 \times 10^{9}$ | 60 |
| 10 | " | 1.30 | $2.4 \times 10^{9}$ | 75 |
| 11 | " | 1.61 | $1.8 \times 10^{9}$ | 100 |
| 12 | " | 2.03 | $1.2 \times 10^{9}$ | 100 |
| 13 | Q + A (1:2.25) | 1.05 | $8.6 \times 10^{9}$ | 70 |
| 14 | " | 1.28 | $4.9 \times 10^{9}$ | 85 |
| 15 | " | 1.50 | $2.7 \times 10^{9}$ | 100 |
| 16 | " | 1.93 | $1.9 \times 10^{9}$ | 100 |
| 17 | Q + A (1:3) | 0.98 | $2.7 \times 10^{10}$ | 90 |
| 18 | " | 1.12 | $2.7 \times 10^{10}$ | 100 |
| 19 | " | 1.35 | $8.9 \times 10^{13}$ | 100 |
| 20 | " | 1.68 | $4.3 \times 10^{9}$ | 100 |
| 21 | Q + A (1:3.75) | 0.91 | $2.7 \times 10^{13}$ | 75 |
| 22 | " | 1.36 | $5.3 \times 10^{12}$ | 95 |
| 23 | " | 1.81 | $1.3 \times 10^{10}$ | 100 |
| 24 | " | 2.04 | $1.4 \times 10^{11}$ | 100 |
| 25 | N + A (3:1) | 1.02 | $1.8 \times 10^{11}$ | 0 |
| 26 | " | 1.18 | $2.1 \times 10^{10}$ | 10 |
| 27 | " | 1.69 | $7.8 \times 10^{9}$ | 25 |
| 28 | " | 2.09 | $4.5 \times 10^{9}$ | 25 |
| CONTROL | — | — | $>10^{16}$ | 0 |

The Table also illustrates the adhesive qualities of the coatings of this invention when compared with uncoated film (control) and the prior art film of Examples 25–28. The adhesive test is conducted using a simulated reprographic lacquer comprising (in parts by weight) 9 parts cellulose acetate butyrate of "20 second" grade dissolved in a mixture of 88 parts ethylene glycol monomethyl ether (methyl cellosolve) and 3 parts methyl ethyl ketone with Rhodamine B dye added for color (3 parts of a 1% Rhodamine B dye in n-butanol). The lacquer was applied to the coated surface of each of the films tested by means of a wire-wound bar, Meyer rod No. 70, and cured in an oven for 5 minutes at 60° C. The coating was scored with a cross-hatched pattern by means of a scalpel. A strip of adhesive tape (Scotch tape 610) was adhered to the cross-hatched area, rubbed with a fingernail to insure intimate contact and then pulled rapidly from the film. The amount of lacquer remaining in the cross-hatched area was expressed as a percentage of this amount, i.e., no lacquer removed =100% adhesion, all lacquer removed =0% adhesion with intermediate adhesion values being assessed in terms of the proportion of lacquer area remaining adhered to the film. The test was done twice on two sheets (total of 4 areas tested) and the adhesion value reported as that of the test area showing the most failure.

Test results demonstrating 95% adhesion or less are not generally considered acceptable by commercial standards. Results of greater than 95% to less than 100% are considered reasonably acceptable, while test results demonstrating 100% adhesion are the target standard for commercial acceptability.

What I claim is:

1. An oriented self-supporting plastic film having a thin continuous antistatic coating on one or both sides thereof, said coating comprising a mixture of:

(a) about 15% to about 50% by weight of a quaternary ammonium salt having the formula:

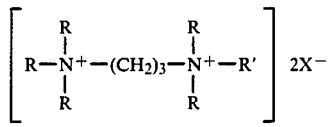

wherein:

R is a lower alkyl group having 1 to 3 carbon atoms;

R' is an alkyl or alkenyl radical having from about 8 to 20 carbon atoms;

$X^-$ is an anion; and (b) about 85% to about 50% by weight of a polymeric binder; said coating being present in an amount effective to provide a film having a surface resistivity not greater than about $10^{13}$ ohms.

2. The film of claim 1 wherein said plastic is selected from the group consisting of polyester, polyamide, polystyrene, polyethylene, polypropylene and polycarbonate.

3. The film of claim 2 wherein said coating has a dry thickness within the range of about $10^{-7}$ to $10^{-5}$ inch.

4. The film of claim 1 wherein said plastic film is biaxially oriented polyethylene terephthalate.

5. The film of claim 4 wherein R is methyl and R' is a radical of about 14 to 18 carbon atoms derived from tallow fatty acid.

6. The film of claim 5 wherein said quarternary ammonium salt is N, N, N, $N^1$, $N^1$-pentamethyl-$N^1$-tallow trimethylenediammonium-bis (methyl sulfate).

7. The film of claim 6 wherein said polymeric binder is selected from the group consisting of acrylic or methacrylic polymers, vinyl acetate polymers, vinylidene chloride polymers, and vinyl aromatic polymers.

8. The film of claim 7 wherein said polymeric binder is a crosslinkable acrylic or methacrylic polymer or copolymer.

9. The film of claim 8 wherein said polymeric binder is a terpolymer of methyl methacrylate, ethyl acrylate and up to about 10 mole % acrylamide, methacrylamide, N-methylolacrylamide, or N-methylolmethacrylamide.

10. The film of claim 8 wherein said polymeric binder is an acrylic or methacrylic polymer or copolymer.

11. The film of claim 10 wherein said polymeric binder is a crosslinked acrylic or methacrylic copolymer.

12. The film of claim 11 having an additional coating applied over said antistat coating, said additional coating selected from the group consisting of a printing ink, a matte drafting layer or a light sensitive layer.

13. The film of claim 1 prepared by melt extruding said plastic to form an amorphous film and thereafter orienting said film by stretching in one or two directions and heat setting the film, said antistatic coating applied to said film as an aqueous dispersion prior to stretching in one direction or subsequent to stretching in one direction but prior to stretching in a mutually perpendicular direction, and drying said film.

14. The film of claim 13 wherein said plastic film is biaxially oriented polyethylene terephthalate.

15. The film prepared by claim 14 wherein said film is subjected to a corona discharge treatment prior to the application of said antistatic coating.

16. The film of claim 14 wherein said quarternary ammonium salt is N, N, N, $N^1$, $N^1$-pentamethyl-$N^1$-tallow trimethylenedi-ammonium-bis (methyl sulfate) present at a level of about 10% to about 50% of said mixture.

17. The film of claim 16 wherein said coating has a dry thickness of about $10^{-7}$ to $10^{-5}$ inch.

* * * * *